United States Patent
Han et al.

(10) Patent No.: US 11,343,477 B2
(45) Date of Patent: May 24, 2022

(54) METHOD AND APPARATUS FOR CORRECTING COLOR CONVERGENCE ERROR, AND DEVICE

(71) Applicant: GOERTEK INC., Shandong (CN)

(72) Inventors: Xinxin Han, Weifang (CN); Nanjing Dong, Weifang (CN); Debo Sun, Weifang (CN)

(73) Assignee: GOERTEK INC., Weifang (CN)

(*) Notice: Subject to any disclaimer, the term of this patent is extended or adjusted under 35 U.S.C. 154(b) by 0 days.

(21) Appl. No.: 17/058,617

(22) PCT Filed: Sep. 6, 2018

(86) PCT No.: PCT/CN2018/104396
§ 371 (c)(1),
(2) Date: Nov. 24, 2020

(87) PCT Pub. No.: WO2019/227761
PCT Pub. Date: Dec. 5, 2019

(65) Prior Publication Data
US 2021/0211620 A1    Jul. 8, 2021

(30) Foreign Application Priority Data

May 31, 2018  (CN) .......................... 201810556343.4

(51) Int. Cl.
H04N 9/31    (2006.01)
(52) U.S. Cl.
CPC ......... *H04N 9/3182* (2013.01); *H04N 9/3191* (2013.01)
(58) Field of Classification Search
CPC .. H04N 9/3182; H04N 9/3191; H04N 9/3185; H04N 9/3164
See application file for complete search history.

(56) References Cited

U.S. PATENT DOCUMENTS

| | | | |
|---|---|---|---|
| 8,847,972 B2* | 9/2014 | Kane | G01J 1/4204 345/589 |
| 8,964,070 B2* | 2/2015 | Koishi | G03B 29/00 348/251 |

(Continued)

FOREIGN PATENT DOCUMENTS

| | | |
|---|---|---|
| CN | 1347622 A | 5/2002 |
| CN | 201919121 U | 8/2011 |

(Continued)

OTHER PUBLICATIONS

Chinese Office Action dated Sep. 20, 2019 as received in application No. 201810556343.4.

*Primary Examiner* — Brian P Yenke
(74) *Attorney, Agent, or Firm* — Maschoff Brennan

(57) ABSTRACT

Provided are a method and an apparatus for correcting a color convergence error, and a device. The method includes: in a darkroom environment, acquiring a projection image obtained by projecting a test pattern containing N white shape points by a projection system, where N is an integer greater than or equal to 2; performing color separation on N shape image points on the projection image, to obtain N shape image points corresponding to R, G, and B color components respectively; determining color coordinates corresponding to R, G, and B according to the N shape image points corresponding to R, G, and B color components respectively; and adjusting an assembly parameter of the projection system according to the color coordinates corresponding to the R, G, and B. The present disclosure may detect and correct color convergence error of the projection system.

13 Claims, 5 Drawing Sheets

(56) References Cited

U.S. PATENT DOCUMENTS

| | | | |
|---|---|---|---|
| 9,022,576 B2* | 5/2015 | Jeong | G09G 3/22 353/84 |
| 9,057,937 B2* | 6/2015 | Yamamoto | G03B 21/147 |
| 9,100,591 B2* | 8/2015 | Kozak | G03B 33/06 |
| 9,106,811 B2* | 8/2015 | Tan | G06T 5/00 |
| 9,270,961 B2* | 2/2016 | Rudoy | H04N 1/603 |
| 9,357,206 B2* | 5/2016 | Thomas | H04N 9/3147 |
| 9,495,936 B1* | 11/2016 | Norquist | G06F 3/147 |
| 9,532,018 B2* | 12/2016 | Ishikawa | G03B 37/04 |
| 9,654,750 B2* | 5/2017 | Kunieda | G03B 21/147 |
| 9,711,096 B2* | 7/2017 | Kozak | G09G 3/3607 |
| 9,762,869 B2* | 9/2017 | Nakashin | H04N 9/3185 |
| 9,832,437 B2* | 11/2017 | Kass | G06F 3/01 |
| 9,918,058 B2* | 3/2018 | Takahashi | H04N 9/3129 |
| 10,170,077 B2* | 1/2019 | Okamoto | G09G 5/02 |
| 10,171,781 B2* | 1/2019 | Oka | H04N 5/35572 |
| 10,271,028 B1* | 4/2019 | Lamm | G06T 7/70 |
| 10,440,337 B2* | 10/2019 | Wada | H04N 9/3185 |
| 10,630,948 B2* | 4/2020 | Post | H04N 9/3182 |
| 10,694,160 B2* | 6/2020 | Tait | H04N 9/3182 |
| 10,819,964 B2* | 10/2020 | Narikawa | H04N 9/3182 |
| 10,979,682 B2* | 4/2021 | Ichieda | H04N 9/3191 |
| 10,986,322 B1* | 4/2021 | Chen | H04N 9/735 |
| 11,050,986 B2* | 6/2021 | Lee | H04N 9/73 |
| 11,082,676 B2* | 8/2021 | Lee | H04N 9/73 |
| 11,153,544 B2* | 10/2021 | Han | H04N 9/3194 |
| 11,245,881 B2* | 2/2022 | Han | G03B 21/567 |
| 2003/0123031 A1* | 7/2003 | Nelson | H04N 9/3105 353/31 |
| 2014/0022513 A1* | 1/2014 | Mizuno | H04N 9/3194 353/31 |
| 2015/0015852 A1* | 1/2015 | Furui | H04N 9/3185 353/69 |
| 2015/0221281 A1 | 8/2015 | Bosco | |
| 2015/0229896 A1* | 8/2015 | Grundhofer | H04N 9/3194 348/747 |
| 2015/0381972 A1* | 12/2015 | Kowdle | G06T 7/521 348/51 |
| 2016/0241827 A1* | 8/2016 | Kass | H04N 9/67 |
| 2017/0244941 A1* | 8/2017 | Yagi | H04N 9/3182 |
| 2017/0318271 A1* | 11/2017 | Sourani | H04N 9/3185 |
| 2019/0035109 A1* | 1/2019 | Kaji | G06T 7/74 |
| 2019/0141302 A1* | 5/2019 | Fukui | H04N 9/3182 |
| 2019/0215500 A1* | 7/2019 | Yamagishi | G06T 7/70 |
| 2020/0162710 A1* | 5/2020 | Tait | H04N 9/3185 |
| 2020/0238455 A1* | 7/2020 | Dong | G02B 7/023 |
| 2020/0244937 A1* | 7/2020 | Mitsumori | H04N 9/3191 |
| 2020/0413015 A1* | 12/2020 | Asai | H04N 9/3185 |
| 2021/0029332 A1* | 1/2021 | Hsiao | H04N 9/3182 |
| 2021/0063861 A1* | 3/2021 | Okino | H04N 9/3185 |
| 2021/0127096 A1* | 4/2021 | Lin | H04N 9/3147 |
| 2021/0195152 A1* | 6/2021 | Oike | H04N 9/3182 |
| 2021/0209750 A1* | 7/2021 | Aponte | G06T 7/557 |
| 2021/0235047 A1* | 7/2021 | Han | H04N 9/3185 |
| 2021/0248734 A1* | 8/2021 | Han | G06T 7/13 |
| 2021/0258548 A1* | 8/2021 | Aoki | G09G 5/36 |
| 2021/0373352 A1* | 12/2021 | Fang | G02B 27/62 |

FOREIGN PATENT DOCUMENTS

| | | |
|---|---|---|
| CN | 103702096 A | 4/2014 |
| CN | 108012131 A | 5/2018 |

* cited by examiner

METHOD AND APPARATUS FOR CORRECTING COLOR CONVERGENCE ERROR, AND DEVICE

TECHNICAL FIELD

The present disclosure relates to the field of assembling technology, and in particular a method and an apparatus for correcting a color convergence error, and a device.

BACKGROUND

In order to solve the defect of insufficient color gamut space in traditional display technologies, display technologies based on red (R), green (G), and blue (B) light sources have emerged, such as three-chip reflective/projection display technology, laser scanning display technology and laser projection display technology, etc. These display technologies based on RGB three-color light source can truly reproduce the rich and gorgeous colors of the objective world and provide more shocking color expression.

The display technologies based on RGB three-color light sources usually include three light sources, and each light source corresponds to one of the three primary colors. A variety of colored lights can be obtained after the lights emitted by the three light sources are mixed in different proportions.

However, due to the mechanical error of the system assembly and the chromatic aberration of the optical component, in the image displayed by the display technology based on the RGB three-color light source, there may be overlapping error in the red, green, and blue pixels, which will affect the clarity of the image. In view of this, a method for correcting the color convergence error needs to be proposed urgently.

SUMMARY

Various aspects of the present disclosure provide a method and an apparatus for correcting a color convergence error, and a device, which are used to detect and correct the color convergence error of a projection system, to improve the imaging quality of the projection optical module.

The present disclosure provides a method for correcting a color convergence error, including: in a darkroom environment, acquiring a projection image obtained by projecting a test pattern containing N white shape points by a projection system, where N is an integer greater than or equal to 2; performing color separation on N shape image points on the projection image, to obtain N shape image points corresponding to R, G, and B color components respectively; determining color coordinates corresponding to R, G, and B according to the N shape image points corresponding to R, G, and B color components respectively; and adjusting an assembly parameter of the projection system according to the color coordinates corresponding to the R, G, and B.

Further optionally, the performing the color separation on the N shape image points on the projection image, to obtain the N shape image points corresponding to the R, G, and B color components respectively, includes: with regard to any shape image point in the N shape image points, performing gray-scale on the shape image point, to obtain a gray-scaled shape image point; determining color value of each pixel point on the gray-scaled image point according to gray-scale value of the gray-scaled shape image point; and dividing the each pixel into a corresponding color type according to the color value of each pixel and color value corresponding to the R, G, and B color components, to obtain shape image points corresponding to R, G, and B color components respectively.

Further optionally, the determining the color coordinates corresponding to the R, G, and B according to a projection geometry corresponding to the three color components of R, G, and B includes: with regard to any color component in the R, G, and B color components, acquiring respective a center-of-mass coordinate of the N shape image points corresponding to the color component; and calculating the color coordinates corresponding to the color components according to respective center-of-mass coordinate of the N shape image points.

Further optionally, the calculating the color coordinates corresponding to the color components according to the respective center-of-mass coordinate of the N shape image points includes: calculating a center of a geometric figure by taking center-of-mass coordinates of the N shape image points as vertex coordinates; and taking a coordinate of the center of the geometric figure as the color coordinate corresponding to the color component.

Further optionally, when the projection system is a projection system based on RGB three-color light source imaging, the adjusting the assembly parameter of the projection system according to the color coordinates corresponding to the R, G, and B includes: calculating a superposition deviation of the three color components of R, G, and B according to the color coordinates corresponding to the R, G, and B; if the superposition deviation is greater than a set deviation threshold, adjusting a position of a RGB three-color light source in the projection system, to reduce the superposition deviation.

Further optionally, the shape points contained in the test pattern comprise: solid geometric figure points or hollow geometric figure boxes.

Further optionally, N=4, and the shape points contained in the test pattern are hollow rectangular boxes.

The present disclosure further provides an apparatus for correcting a color convergence error, including: a projecting module, configured to in a darkroom environment, acquire a projection image obtained by projecting a test pattern containing N white shape points by a projection system, where N is an integer greater than or equal to 2; a color separating module, configured to perform color separation on N shape image points on the projection image, to obtain N shape image points corresponding to R, G, and B color components respectively; a color coordinate calculating module, configured to determine color coordinates corresponding to R, G, and B according to the N shape image points corresponding to R, G, and B color components respectively; and an error correcting module, configured to adjust an assembly parameter of the projection system according to the color coordinates corresponding to the R, G, and B.

Further optionally, the color coordinate calculating module is specifically configured to: with regard to any color component in the R, G, and B color components, acquire respective a center-of-mass coordinate of the N shape image points corresponding to the color component; and calculate the color coordinates corresponding to the color components according to respective center-of-mass coordinate of the N shape image points.

The present disclosure further provides an electronic device, including: a memory and a processor; where the memory is used to store at least one computer instruction; and the processor is used to execute the at least one computer instruction to be used to execute the method for correcting the color convergence error provided by the present disclosure.

In the present disclosure, the projection image of the test pattern containing the white shape points of the projection system, and the color coordinates corresponding to the three color components of R, G, and B are extracted from the projection image. Furthermore, it can be determined whether the different color components projected by the projection system superpose based on the color coordinates corresponding to each of the three color components. In such a technical solution, the color convergence error of the projection system may be effectively detected and corrected, which is beneficial to improve the imaging quality of the projection system.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

Figure 1:
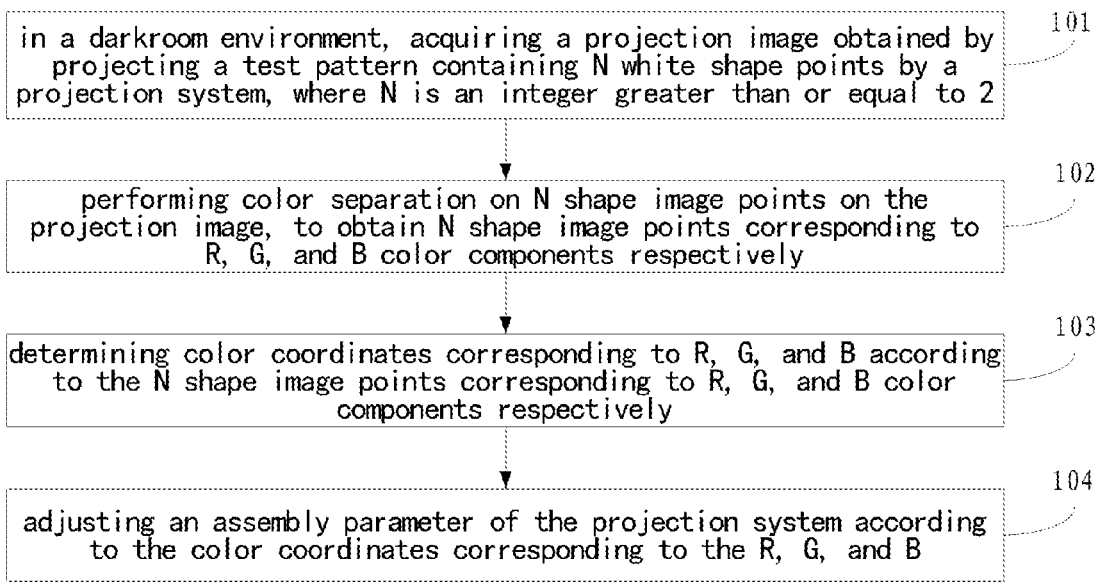
FIG. 1 is a flowchart of a method for correcting a color convergence error according to an embodiment according to the present disclosure.

FIG. 1 is a flowchart of a method for correcting a color convergence error according to an embodiment of the present disclosure. As shown in FIG. 1, the method includes:

step 101: in a darkroom environment, acquiring a projection image obtained by projecting a test pattern containing N white shape points by a projection system, where N is an integer greater than or equal to 2;

step 102: performing color separation on N shape image points on the projection image, to obtain N shape image points corresponding to R, G, and B color components respectively;

step 103: determining color coordinates corresponding to R, G, and B according to the N shape image points corresponding to R, G, and B color components respectively; and step 104: adjusting an assembly parameter of the projection system according to the color coordinates corresponding to the R, G, and B.

In this embodiment, when acquiring the projection image, it needs to be performed in a darkroom environment. The test pattern contains white shaped points. If the projection system is disturbed by stray light from the external environment during imaging, the contrast of the projection image obtained after the test pattern being projected may decrease, and the detection accuracy of the color convergence error may decrease as well. Therefore, when implementing the color convergence error detection method provided by the present disclosure, the test pattern needs to be projected in a darkroom environment and the shape image points obtained by the projection need to be photographed in the darkroom environment, to avoid the interference on the imaging effect of the projection system caused by the ambient light.

The test pattern used in this embodiment includes N white shape points, and N shape image points are obtained after projection. The shape point refers to a point with a certain geometric shape, such as a triangular point, a rectangular point, a circular point, a cross-shaped point, or other shapes. For the convenience of description, the image point obtained after the shape point being projected is marked as the shape image point.

When there is no color convergence error in the projection system, the N shape image points contained in the projection image are white, and the N white shape image points are superimposed by three primary colors of R (red), G (green), and B (blue) color. Based on this, in this embodiment, it is possible to analyze whether there is a color convergence error in the projection system based on whether the superposition of the R, G, and B color components of the N shape image points included in the projection image is good.

Before analyzing whether the superposition of the R, G, and B color components of the N shape image points is good, color separation can be can be processed on the N shape image points on the projection image. In the RGB color mode, different colors are obtained by superimposing the three color components of R, G, and B in a certain proportion. The color separation refers to the process of decomposing the superimposed color into three color components, R, G, and B. The color of each pixel on the N white shape points included in the test pattern includes three color components of RGB. Correspondingly, the color of each pixel on the N shape image points obtained by projection also includes three color components of RGB. Performing color separation on the N shape image points can obtain N shape image points corresponding to the R, G, and B color components.

After the N shape image points corresponding to the R, G, and B color components are determined, the color coordinates corresponding to the R, G, and B can then be calculated next. The color coordinates refer to: the coordinates corresponding to the three color components of R, G, and B contained in the image-side pixel obtained after a pixel of a certain coordinate on the object-side projected by the projection system. It should be understood that when there is a color convergence error in the projection system, there is position deviation between the coordinates of the three color components of R, G, and B contained in the image-side pixel have; on the contrary, when there is no color convergence error in the projection system, the three color components of the R, G, and B contained in the image-side pixel superpose. After the color coordinates corresponding to R, G, and B are determined, it can be judged whether the superposition of the three color pixels of R, G, and B meets the requirement, and the assembly parameter of the projection system can be adjusted when the requirements are not met.

In this embodiment, the projection image of the projection system for the test pattern containing the white shape points is collected, and the color coordinates corresponding to each of the three color components of R, G, and B are extracted from the projection image. Furthermore, it can be determined whether the different color components projected by the projection system superpose based on the color coordinates corresponding to each of the three color components. In such a technical solution, the color convergence error of the projection system can be effectively detected and corrected, which is beneficial to improve the imaging quality of the projection system.

Figure 2A:
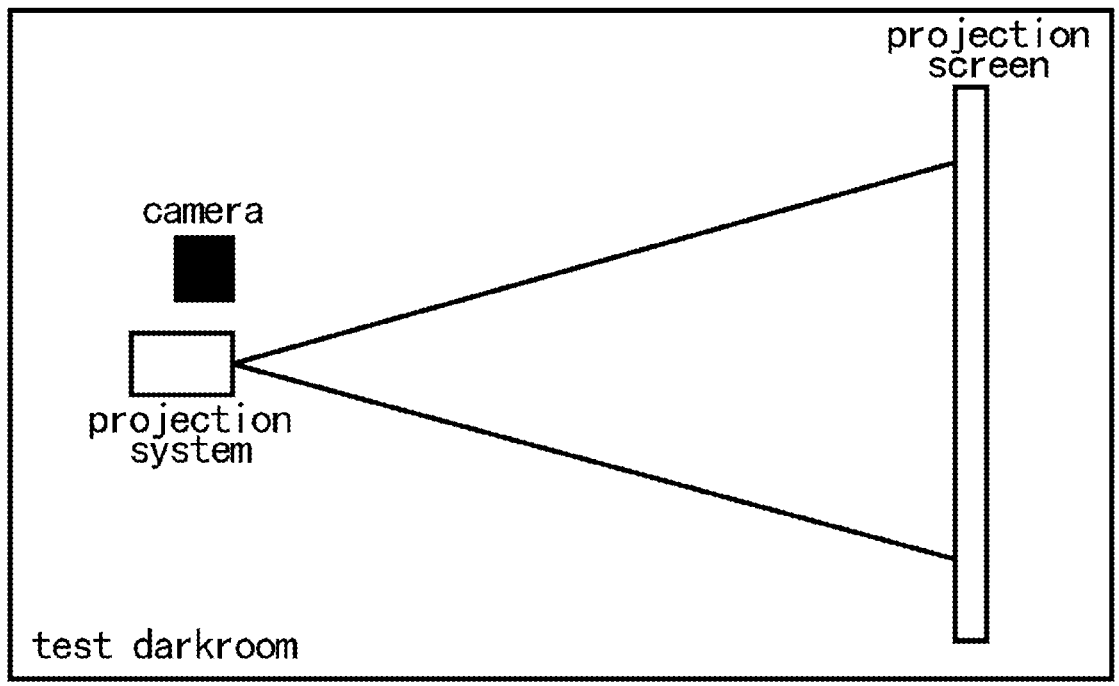
FIG. 2a is a schematic diagram of projecting and shooting a projection image in a darkroom environment according to an embodiment of the present disclosure.

Optionally, when performing the embodiment of the present disclosure, the operation of projecting the test pattern and shooting the projection image in the darkroom environment can refer to the schematic diagram of FIG. 2a. In the test darkroom, the projection system projects on the projection screen, and the camera can collect the projection image from the projection screen.

Figure 2B:
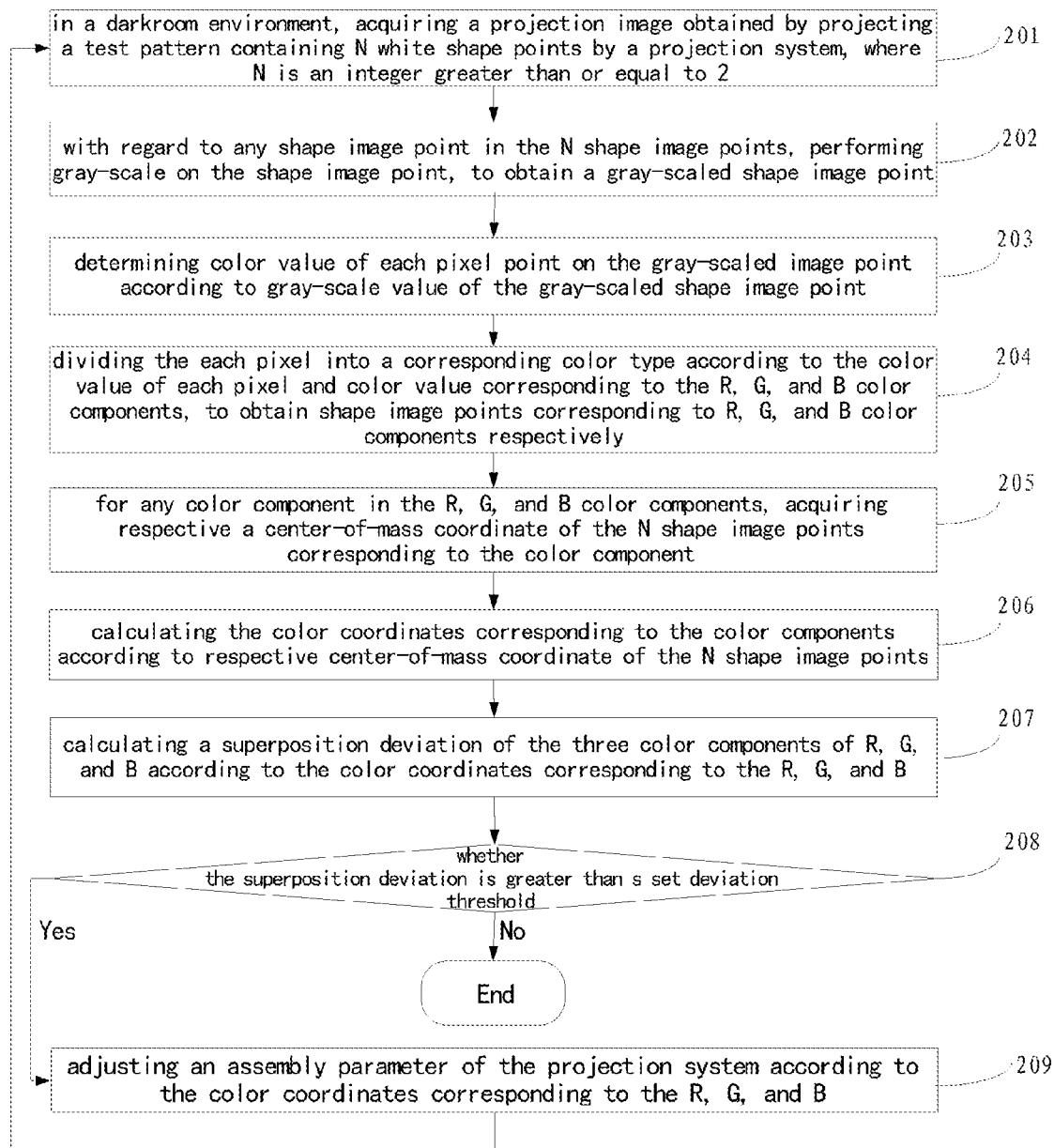
FIG. 2b is a flowchart of a method for correcting a color convergence error according to another embodiment according to the present disclosure.

FIG. 2b is a flowchart of a method for correcting a color convergence error according to another embodiment according to the present disclosure. As shown in FIG. 2b, the method includes:

step 201: in a darkroom environment, acquiring a projection image obtained by projecting a test pattern containing N white shape points by a projection system, where N is an integer greater than or equal to 2;

step 202: with regard to any shape image point in the N shape image points, performing gray-scale on the shape image point, to obtain a gray-scaled shape image point;

step 203: determining color value of each pixel point on the gray-scaled image point according to gray-scale value of the gray-scaled shape image point;

step 204: dividing the each pixel into a corresponding color type according to the color value of each pixel and color value corresponding to the R, G, and B color components, to obtain shape image points corresponding to R, G, and B color components respectively;

step 205: with regard to any color component in the R, G, and B color components, acquiring respective a center-of-mass coordinate of the N shape image points corresponding to the color component;

step 206: calculating the color coordinates corresponding to the color components according to respective center-of-mass coordinate of the N shape image points;

step 207: calculating a superposition deviation of the three color components of R, G, and B according to the color coordinates corresponding to the R, G, and B;

step 208: determining whether the superposition deviation is greater than s set deviation threshold; if yes, executing step 209; if no, ending the execution; and step 209: adjusting an assembly parameter of the projection system according to the color coordinates corresponding to the R, G, and B, and executing step 201.

In step 201, optionally, designing at least two shape points on the test pattern can increase the number of a pixel used to detect the color convergence error, minimize the impact of measurement errors in a few pixels on the overall detection result, and improve the reliability of error detection result.

In order to take into account both the correction efficiency and the correction effect of the color convergence error, the inventor has repeatedly tested and found that when N=4, a better correction efficiency and correction effect can be achieved. For convenience of description, the following content will take the test pattern containing 4 white shape points as an example to illustrate the technical solution of the present disclosure, but it should be understood that in fact, the technical solution of the present disclosure does not limit each set to include 4 shape points.

Optionally, the background color of the test pattern can be black to avoid the introduction of other colors of light from affecting the contrast of the shape image points. Optionally, the shape point may be a solid geometric figure point or a hollow geometric figure frame, etc., which is not limited in this embodiment.

Figure 3A:
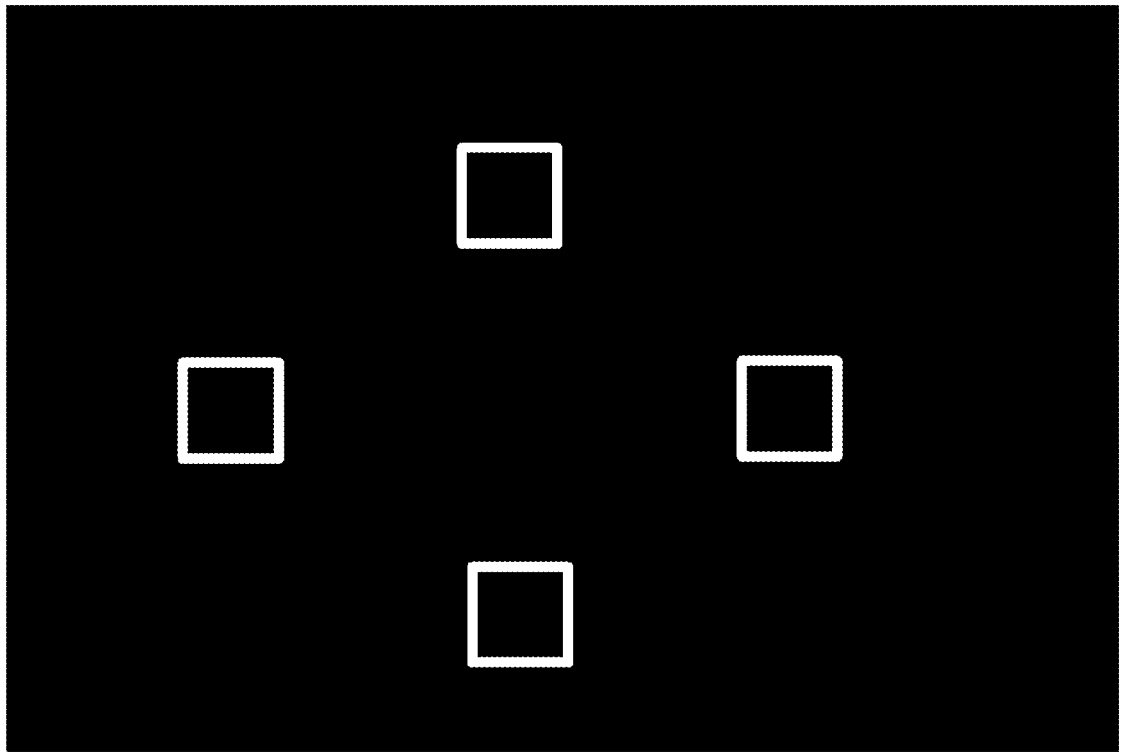
FIG. 3a is a schematic diagram of a test pattern according to an embodiment of the present disclosure.

An optional test pattern may be shown in FIG. 3a. The test pattern has a black background, the black background includes 4 white shape points, and the shape points are hollow rectangular boxes.

In step 202, after the projection image is acquired, the gray-scale can be performed on the projection image directly, and N gray-scaled shape image points can be acquired from the gray-scaled projection image.

Next, in step 203, after the gray-scaled N shape image points are acquired, the gray-scaled N shape image points can be converted to the RGB color space. Optionally, during the conversion, the color value corresponding to the gray-scale value can be calculated according to the gray-scale value of the gray-scaled shape image point. Generally, for an 8-bit image, the gray-scale value of a pixel point is represented by 256 decimal numbers between 0-255. The gray-scale value can be obtained by the weighted summation of the color values corresponding to the three color components of R, G, and B according to the set weight. Therefore, for each pixel, the gray-scale value can be calculated inversely to obtain the three color values corresponding to the pixel.

In the three color components of R, G, and B, each color component corresponds to one color value or a color value range. Therefore, in step 204, after the color value of each pixel point on the gray-scaled image point is determined, each pixel point can be divided into a corresponding color type by referring to the color value or the color value range corresponding to each color component. It should be understood that the pixel point where the two color components are superimposed can be divided into two different color types at the same time; similarly, the pixel point where the three color components are superimposed can be divided into three different color types at the same time.

Figure 3B:
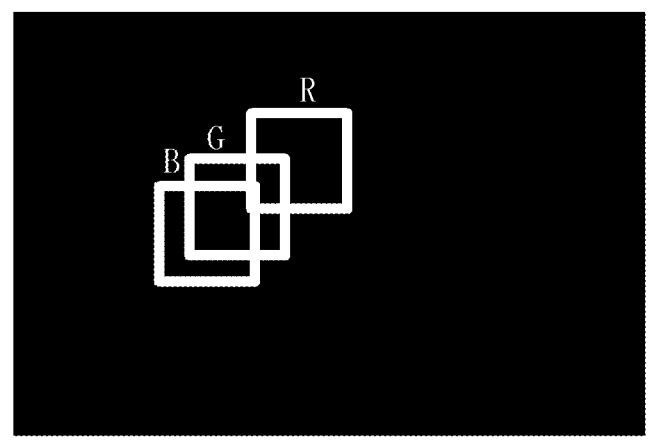
FIG. 3b is a schematic diagram of a shape image point corresponding to the R, G, and B color components obtained after color separation.

Furthermore, the N shape image points corresponding to the R color component, N shape image points corresponding to the G color component, and N shape image points corresponding to the B color component can be divided finally from the gray-scaled N shape image points. FIG. 3b is a schematic diagram of a shape image point corresponding to the R, G, and B color components obtained after color separation. It should be understood that the shape image points corresponding to the three color components in FIG. 3b have a greater degree of separation, which is just to show more clearly.

X0Y plane coordinate system is used to mark the coordinate system where the projection image is located. In step 205, for the R color component, the center-of-mass coordinates of the corresponding N shape image points can be calculated respectively, marked as $P_{Ri}$ ($X_{Ri}$, $Y_{Ri}$); for the color component, the center-of-mass coordinates of the corresponding N shape image points can be calculated separately, marked as $P_{Gi}$ ($X_{Gi}$, $Y_{Gi}$); for the B color component, the center-of-mass coordinates of the corresponding N shape image points can be calculated separately, marked as $P_{Bi}$ ($X_{Gi}$, $Y_{Gi}$); where i=1, 2, 3 . . . N.

It should be understood that, in this embodiment, the center-of-mass coordinates of the shape image points are calculated from the positions of multiple pixel points included in the shape image points, which can further reduce the impact of measurement error in a few pixels on the overall detection result.

In step 206, optionally, when N=2, for each color component, the midpoint of the line segment formed by the center-of-mass coordinates of the two shape image points corresponding to the color components can be first determined; then, the midpoint coordinate of the line segment is calculated, and the midpoint coordinate is used as the color coordinate corresponding to the color component.

Optionally, when N≥3, for each color component, the center of the geometric figure by taking the center-of-mass coordinates of the N shape image points corresponding to the color component as the vertex coordinates can be determined first; next, the coordinate of the center of the geometric figure is calculated, and the center coordinate of the geometric figure is taken as the color coordinate corresponding to the color component. For example, when N is equal to 3, the R color component corresponds to 3 shape image points. Taking the center-of-mass coordinates of the three shape image points as the vertex coordinates, a triangle can be obtained, and the coordinates of the center of the triangle can be used as the color coordinates corresponding to the R color component.

Take the calculation of the color coordinates corresponding to the R color component when N=4 as an example: the center of the first rectangle by taking the $P_{R1}$ ($X_{R1}$, $Y_{R1}$), $P_{R2}$ ($X_{R2}$, $Y_{R2}$), $P_{R3}$ ($X_{R3}$, $Y_{R3}$) and $P_{R4}$ ($X_{R4}$, $Y_{R4}$) as vertices is determine first; then the coordinate of the center of the first rectangle is calculated, and the coordinate is used as the coordinate corresponding to the R color component.

Figure 3C:
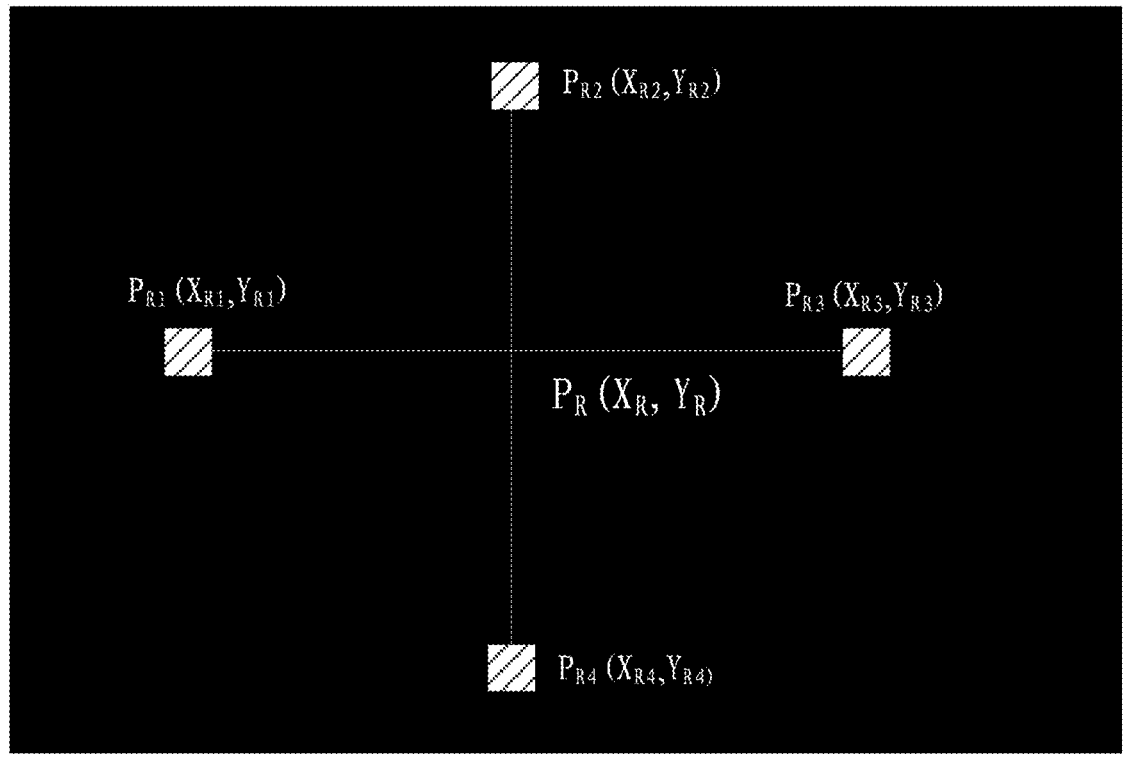
FIG. 3c is an schematic diagram of calculating color coordinates corresponding to R color components according to an embodiment of the present disclosure.

Optionally, when calculating the coordinate of the center of the first rectangle, the coordinates of the intersection points of the diagonal lines formed by the four vertices of the first rectangle may be calculated. For example, as shown in FIG. 3c, the intersection point $P_R$ ($X_R$, $Y_R$) of the straight line formed by $P_{R1}$ ($X_{R1}$, $Y_{R1}$) and $P_{R3}$ ($X_{R3}$, $Y_{R3}$) and the straight line formed by $P_{R2}$ ($X_{R2}$, $Y_{R2}$) and $P_{R4}$ ($X_{R4}$, $Y_{R4}$) can be calculated as the coordinates of the center of the first rectangle. In the same way, the color coordinates $P_G$ ($X_G$, $Y_G$) corresponding to the G color component and the color coordinates $P_B$ ($X_B$, $Y_B$) corresponding to the B color component can be calculated, which will not be repeated.

In step 207, optionally, the values of $X_R-X_G$, $X_R-X_B$, $X_G-X_B$, and $Y_R-Y_G$, $Y_R-Y_B$, and $Y_G-Y_B$ can be directly calculated as the superposition deviation of the pair of color components.

Optionally, this embodiment is suitable for a projection system based on RGB three-color light source imaging. The display component of the projection system based on RGB three-color light source imaging includes RGB three-color light sources: a first color light source, a second color light source, and a third color light source. When the superposition deviation of the three color components of RGB obtained by the projection of the RGB three-color light source is greater than the set deviation threshold, it can be considered that there is an assembly error among the first color light source, the second color light source, and the third color light source.

In steps 207-209, when the superposition deviation is greater than the set deviation threshold, the position of the R, G, and B three-color light source in the projection system can be adjusted. After the adjustment, step 201 can be executed again to continue to detect whether there is still a color convergence error. Optionally, the deviation threshold is an empirical value related to actual demand, which is not limited in this embodiment.

In this embodiment, the projection image of the test pattern containing the white shape points of the projection system, and the color coordinates corresponding to the three color components of R, G, and B are extracted from the projection image. Furthermore, it can be determined whether the different color components projected by the projection system superpose based on the color coordinates corresponding to each of the three color components. In such a technical solution, the color convergence error of the projection system may be effectively detected and corrected, which is beneficial to improve the imaging quality of the projection system.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 4:
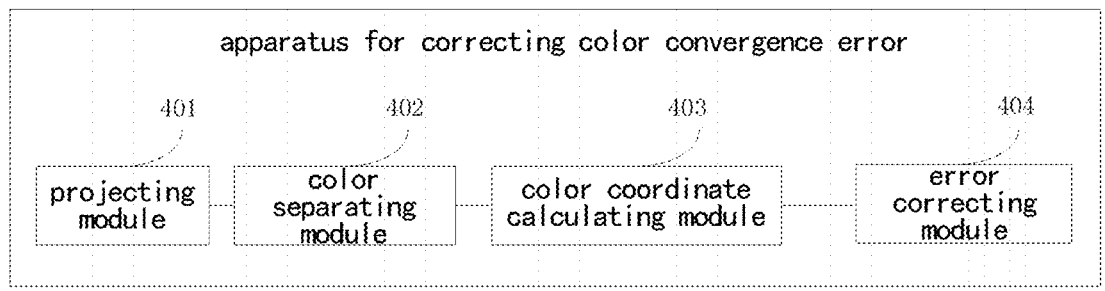
FIG. 4 is a schematic structural diagram of an apparatus for correcting a color convergence error according to an embodiment of the present disclosure.

The above describes alternative implementations of the method for correcting the color convergence error. As shown in FIG. 4, in practice, the method for correcting the color convergence error can be implemented by an apparatus for correcting the color convergence error, as shown in FIG. 4, the apparatus includes:

a projecting module 401, configured to in a darkroom environment, acquire a projection image obtained by projecting a test pattern containing N white shape points by a projection system, wherein N is an integer greater than or equal to 2;

a color separating module 402, configured to perform color separation on N shape image points on the projection image, to obtain N shape image points corresponding to R, G, and B color components respectively;

a color coordinate calculating module 403, configured to determine color coordinates corresponding to R, G, and B according to the N shape image points corresponding to R, G, and B color components respectively; and an error correcting module 404, configured to adjust an assembly parameter of the projection system according to the color coordinates corresponding to the R, G, and B.

Further optionally, the color separating module 402 is specifically configured to: with regard to any shape image point in the N shape image points, perform gray-scale on the shape image point, to obtain a gray-scaled shape image point; determine color value of each pixel point on the gray-scaled image point according to gray-scale value of the gray-scaled shape image point; and divide the each pixel into a corresponding color type according to the color value of each pixel and color value corresponding to the R, G, and B color components, to obtain shape image points corresponding to R, G, and B color components respectively.

Further optionally, the color coordinate calculating module 403 is specifically configured to: with regard to any color component in the R, G, and B color components, acquire respective a center-of-mass coordinate of the N shape image points corresponding to the color component; and calculate the color coordinates corresponding to the color components according to respective center-of-mass coordinate of the N shape image points.

Further optionally, the color coordinate calculating module 403 is specifically configured to: calculate a center of a geometric figure by taking center-of-mass coordinates of the N shape image points as vertex coordinates; and take a coordinate of the center of the geometric figure as the color coordinate corresponding to the color component.

Further optionally, the error correcting module 404 is specifically configured to: calculate a superposition deviation of the three color components of R, G, and B according to the color coordinates corresponding to the R, G, and B; if the superposition deviation is greater than a set deviation threshold, adjust a position of a RGB three-color light source in the projection system, to reduce the superposition deviation.

Further optionally, the shape points contained in the test pattern comprise: solid geometric figure points or hollow geometric figure boxes.

Further optionally, N=4, and the shape points contained in the test pattern are hollow rectangular boxes.

The aforementioned apparatus for correcting the color convergence error can execute the method for correcting the color convergence error according to the embodiment of the present disclosure, and has the corresponding functional modules and beneficial effects for the execution method. Technical details that are not described in detail in the present embodiment can refer to the method provided in the embodiment of the present disclosure, and will not be repeated.

Figure 5:
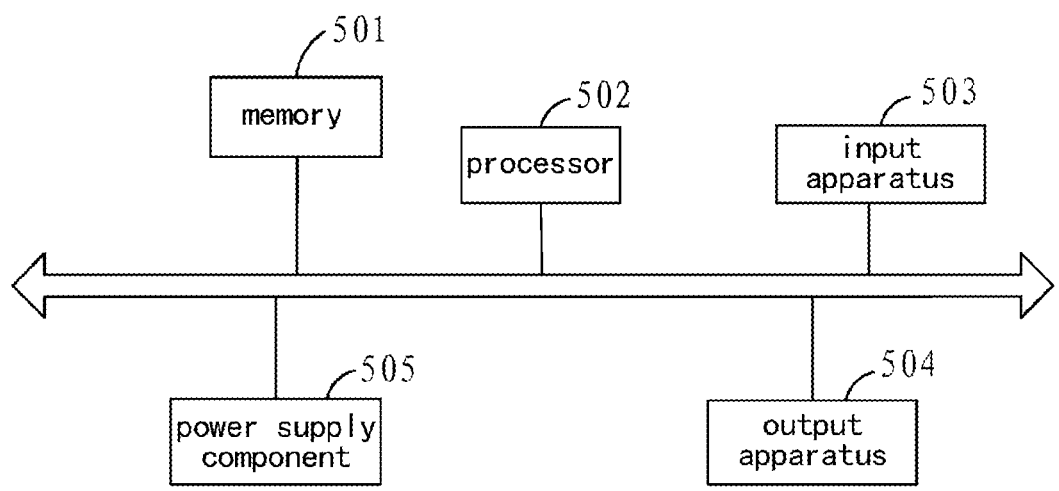
FIG. 5 is a schematic structural diagram of an electronic device according to an embodiment of the present disclosure.

The internal structure and function of the apparatus for correcting the color convergence error are described above. In practice, the apparatus for correcting the color convergence error can be represented as an electronic device. As shown in FIG. 5, the electronic device includes a memory 501, a processor 502, an input apparatus 503, and an output apparatus 504.

The memory 501, the processor 502, the input apparatus 503, and the output apparatus 504 may be connected by a bus or other means. The bus connection is taken as an example in FIG. 5.

The memory 501 is used to store one or more computer instructions, and can be configured to store various other data to support operations on the electronic device. Examples of such data include instructions of any application or method operated on the electronic device.

The memory 501 can be implemented by any type of volatile or non-volatile storage device or a combination of them, such as static random access memory (SRAM for short), electrically erasable programmable read-only memory (EEPROM for short), erasable Programmable Read Only Memory (EPROM for short), Programmable Read Only Memory (PROM for short), Read Only Memory (ROM for short), Magnetic Memory, Flash Memory, Magnetic Disk or Optical Disk.

In some embodiments, the memory 501 may optionally include a memory remotely set with respect to the processor 502, and the remote memory may be connected to the electronic device via a network. Examples of the aforementioned network include but are not limited to the Internet, corporate intranet, local area network, mobile communication network, and combinations thereof.

The processor 502 is coupled with the memory 501, and is configured to execute the one or more computer instructions for executing the method for correcting the color convergence error provided in the previous embodiments.

The input apparatus 503 can receive inputted number or character information, and generate key signal input related to user setting and function control of the electronic device. The output apparatus 504 may include a display device such as a display screen.

Further, as shown in FIG. 5, the device further includes: a power supply component 505. The power supply component 505 provides power for various components of the device where the power supply component is located. The power supply component may include a power management system, one or more power supplies, and other components associated with generating, managing, and distributing power for the device where the power supply component is located.

The aforementioned device can execute the method for correcting the color convergence error provided by the embodiments of the present application, and has the corresponding functional modules and beneficial effects for the execution method. Technical details that are not described in detail in the present embodiment can refer to the method provided in the embodiment of the present disclosure, and will not be repeated.

The apparatus embodiments described above are merely illustrative, where the units described as separate components may or may not be physically separated, and the components displayed as units may or may not be physical units, i.e., may be located at a place, or may be distributed to multiple network units. Some or all of the modules may be selected according to actual needs to achieve the purpose of the scheme of this embodiment. Those of ordinary skill in the art can understand and implement without creative work.

Through the description of the above implementation modes, those skilled in the art can clearly understand that various implementation modes may be implemented by means of software and a necessary general hardware platform, and of course, by hardware. Based on such understanding, the essence of the foregoing technical solutions or portions making contribution to the prior art may be embodied in the form of software products. The computer software products may be stored in a computer-readable storage medium such as a ROM/RAM, a magnetic disk and an optical disc, including instructions for causing a computer device (which may be a personal computer, a server, or a network device, etc.) to perform the methods described in various embodiments or portions of the embodiments.

It is finally to be noted that the above embodiments are adopted not to limit but only to describe the technical solutions of the present disclosure. Although the present disclosure has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present disclosure.

What is claimed is:

1. A method for correcting a color convergence error, comprising:
   in a darkroom environment, acquiring a projection image obtained by projecting a test pattern containing N white shape points by a projection system, wherein N is an integer greater than or equal to 2;
   performing color separation on N shape image points on the projection image, to obtain N shape image points corresponding to R, G, and B color components respectively;
   determining color coordinates corresponding to R, G, and B according to the N shape image points corresponding to R, G, and B color components respectively; and
   adjusting an assembly parameter of the projection system according to the color coordinates corresponding to the R, G, and B, wherein the assembly parameter comprises a position of a RGB three-color light source in the projection system;
   wherein the performing the color separation on the N shape image points on the projection image, to obtain the N shape image points corresponding to the R, G, and B color components respectively, comprises:
   with regard to any shape image point in the N shape image points, performing gray-scale on the shape image point, to obtain a gray-scaled shape image point;
   determining color value of each pixel point on the gray-scaled image point according to gray-scale value of the gray-scaled shape image point; and
   dividing the each pixel into a corresponding color type according to the color value of each pixel and color value corresponding to the R, G, and B color components, to obtain shape image points corresponding to R, G, and B color components respectively.

2. The method according to claim 1, wherein when the projection system is a projection system based on RGB three-color light source imaging, the adjusting the assembly parameter of the projection system according to the color coordinates corresponding to the R, G, and B comprises:
   calculating a superposition deviation of the three color components of R, G, and B according to the color coordinates corresponding to the R, G, and B;
   if the superposition deviation is greater than a set deviation threshold, adjusting a position of a RGB three-color light source in the projection system, to reduce the superposition deviation.

3. The method according to claim 2, wherein the shape points contained in the test pattern comprise: solid geometric figure points or hollow geometric figure boxes.

4. The method according to claim 2, wherein N=4, and the shape points contained in the test pattern are hollow rectangular boxes.

5. The method according to claim 1, wherein the shape points contained in the test pattern comprise: solid geometric figure points or hollow geometric figure boxes.

6. The method according to claim 1, wherein N=4, and the shape points contained in the test pattern are hollow rectangular boxes.

7. The method according to claim 1, wherein the shape points contained in the test pattern comprise: solid geometric figure points or hollow geometric figure boxes.

8. The method according to claim 1, wherein N=4, and the shape points contained in the test pattern are hollow rectangular boxes.

9. An apparatus for correcting a color convergence error comprising:
   a memory storing instructions; and
   a processor configured to execute the instructions to:
   in a darkroom environment, acquire a projection image obtained by projecting a test pattern containing N white shape points by a projection system, wherein N is an integer greater than or equal to 2;
   perform color separation on N shape image points on the projection image, to obtain N shape image points corresponding to R, G, and B color components respectively;
   determine color coordinates corresponding to R, G, and B according to the N shape image points corresponding to R, G, and B color components respectively; and
   adjust an assembly parameter of the projection system according to the color coordinates corresponding to the R, G, and B, wherein the assembly parameter comprises a position of a RGB three-color light source in the projection system;
   wherein the apparatus is specifically configured to:
   with regard to any shape image point in the N shape image points, perform gray-scale on the shape image point, to obtain a gray-scaled shape image point;
   determine color value of each pixel point on the gray-scaled image point according to gray-scale value of the gray-scaled shape image point; and
   divide the each pixel into a corresponding color type according to the color value of each pixel and color value corresponding to the R, G, and B color components, to obtain shape image points corresponding to R, G, and B color components respectively.

10. The apparatus according to claim 9, wherein the apparatus is specifically configured to:
    with regard to any color component in the R, G, and B color components, acquire respective a center-of-mass coordinate of the N shape image points corresponding to the color component; and
    calculate the color coordinates corresponding to the color components according to respective center-of-mass coordinate of the N shape image points.

11. The apparatus according to claim 9, wherein the shape points contained in the test pattern comprise: solid geometric figure points or hollow geometric figure boxes.

12. The apparatus according to claim 9, wherein N=4, and the shape points contained in the test pattern are hollow rectangular boxes.

13. An electronic device, comprising: a memory and a processor;
    wherein the memory is used to store at least one computer instruction;
    the processor is used to execute the method according to claim 1.

* * * * *